US012027166B2

(12) United States Patent
Yu et al.

(10) Patent No.: US 12,027,166 B2
(45) Date of Patent: Jul. 2, 2024

(54) DIGITAL ASSISTANT REFERENCE RESOLUTION

(71) Applicant: Apple Inc., Cupertino, CA (US)

(72) Inventors: Hong Yu, Santa Clara, CA (US);
Saurabh Adya, San Jose, CA (US);
Shruti Bhargava, Santa Clara, CA (US); Myra C. Lukens, San Francisco, CA (US); Jianpeng Cheng, Shanghai (CN); Lin Li, Sunnyvale, CA (US);
Alkeshkumar M. Patel, San Jose, CA (US); Dhivya Piraviperumal, Santa Clara, CA (US); Stephen G. Pulman, Charlbury (GB)

(73) Assignee: Apple Inc., Cupertino, CA (US)

( * ) Notice: Subject to any disclaimer, the term of this patent is extended or adjusted under 35 U.S.C. 154(b) by 302 days.

(21) Appl. No.: 17/402,328

(22) Filed: Aug. 13, 2021

(65) Prior Publication Data
US 2023/0046337 A1 Feb. 16, 2023

(51) Int. Cl.
*G10L 15/22* (2006.01)
*G06F 3/01* (2006.01)
*G10L 15/18* (2013.01)

(52) U.S. Cl.
CPC ............ *G10L 15/22* (2013.01); *G06F 3/013* (2013.01); *G06F 3/017* (2013.01); *G10L 15/1815* (2013.01); *G10L 2015/228* (2013.01)

(58) Field of Classification Search
CPC ...... G10L 15/22; G10L 15/1815; G06F 3/013
See application file for complete search history.

(56) References Cited

U.S. PATENT DOCUMENTS 7,818,215 B2 10/2010 King et al.
9,633,674 B2 4/2017 Sinha
(Continued)

FOREIGN PATENT DOCUMENTS

CN 108334498 A 7/2018
WO 2018/213321 A1 11/2018
WO 2020/076362 A1 4/2020

OTHER PUBLICATIONS

Ashbrook Daniell, "Enabling Mobile Microinteractions", Retrieved from the Internet: URL: http://danielashbrook.com/wp-content/uploads/2012/06/2009-Ashbrook-Thesis.pdf, May 2010, 186 pages.
Bell Jason, "Machine Learning Hands-On for Developers and Technical Professionals", Wiley, Nov. 3, 2014, 82 pages.
(Continued)

*Primary Examiner* — Ibrahim Siddo
(74) *Attorney, Agent, or Firm* — DLA Piper LLP (US)

(57) ABSTRACT

Systems and processes for operating a digital assistant are provided. An example process for performing a task includes, at an electronic device having one or more processors and memory, receiving a spoken input including a request, receiving an image input including a plurality of objects, selecting a reference resolution module of a plurality of reference resolution modules based on the request and the image input, determining, with the selected reference resolution module, whether the request references a first object of the plurality of objects based on at least the spoken input, and in accordance with a determination that the request references the first object of the plurality of objects, determining a response to the request including information about the first object.

63 Claims, 6 Drawing Sheets

(56) References Cited

U.S. PATENT DOCUMENTS

| | | | |
|---|---|---|---|
| 9,668,121 | B2 | 5/2017 | Naik et al. |
| 9,691,161 | B1 | 6/2017 | Yalniz et al. |
| 9,721,566 | B2 | 8/2017 | Newendorp et al. |
| 9,818,400 | B2 | 11/2017 | Paulik et al. |
| 9,858,925 | B2 | 1/2018 | Gruber et al. |
| 9,886,953 | B2 | 2/2018 | Lemay et al. |
| 9,966,068 | B2 | 5/2018 | Cash et al. |
| 10,074,360 | B2 | 9/2018 | Kim |
| 10,176,167 | B2 | 1/2019 | Evermann |
| 10,185,542 | B2 | 1/2019 | Carson et al. |
| 10,186,254 | B2 | 1/2019 | Williams et al. |
| 2011/0161076 | A1* | 6/2011 | Davis ............... H04M 1/72448 704/E15.001 |
| 2012/0239396 | A1* | 9/2012 | Johnston .......... H04N 21/42203 704/235 |
| 2020/0110864 | A1 | 4/2020 | Casado et al. |

OTHER PUBLICATIONS

Coulouris et al., "Distributed Systems: Concepts and Design (Fifth Edition)", Addison-Wesley, May 7, 2011, 391 pages.

Guo et al., "VizLens: A Robust and Interactive Screen Reader for Interfaces in the Real World", In Proceedings of the 29th Annual Symposium on User Interface Software and Technology (UIST '16), Tokyo, Japan, online available at: https://dl.acm.org/doi/pdf/10.1145/2984511.2984518, Oct. 16-19, 2016, pp. 651-664.

Gupta Naresh, "Inside Bluetooth Low Energy", Artech House, Mar. 1, 2013, 274 pages.

Muller et al., "Control Theoretic Models of Pointing", ACM Transactions on Computer-Human Interaction, Aug. 2017, 36 pages.

Rowland et al., "Designing Connected Products: UX for the Consumer Internet of Things", O'Reilly, May 31, 2015, 452 pages.

International Search Report and Written Opinion received for PCT Patent Application No. PCT/CN2020/110510, mailed on May 19, 2021, 9 pages.

* cited by examiner

DIGITAL ASSISTANT REFERENCE RESOLUTION

FIELD

This relates generally to digital assistant and, more specifically, to resolving references in requests to a digital assistant in various computer-generated reality technologies.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user. In some cases, a user may provide a request that is ambiguous or references an object ambiguously, particularly when in use with various computer-generated reality technologies. Thus, it may be difficult for the digital assistant to determine an appropriate response to the request unless the ambiguous references are resolved.

SUMMARY

Example methods are disclosed herein. An example method includes, at an electronic device having one or more processors and memory, receiving a spoken input including a request, receiving an image input including a plurality of objects, selecting a reference resolution module of a plurality of reference resolution modules based on the request and the image input, determining, with the selected reference resolution module, whether the request references a first object of the plurality of objects based on at least the spoken input, and in accordance with a determination that the request references the first object of the plurality of objects, determining a response to the request including information about the first object.

Example non-transitory computer-readable media are disclosed herein. An example non-transitory computer-readable storage medium stores one or more programs. The one or more programs comprise instructions, which when executed by one or more processors of an electronic device, cause the electronic device to receive a spoken input including a request, receive an image input including a plurality of objects, select a reference resolution module of a plurality of reference resolution modules based on the request and the image input, determine, with the selected reference resolution module, whether the request references a first object of the plurality of objects based on at least the spoken input, and in accordance with a determination that the request references the first object of the plurality of objects, determine a response to the request including information about the first object.

Example electronic devices are disclosed herein. An example electronic device comprises one or more processors; a memory; and one or more programs, where the one or more programs are stored in the memory and configured to be executed by the one or more processors, the one or more programs including instructions for receiving a spoken input including a request, receiving an image input including a plurality of objects, selecting a reference resolution module of a plurality of reference resolution modules based on the request and the image input, determining, with the selected reference resolution module, whether the request references a first object of the plurality of objects based on at least the spoken input, and in accordance with a determination that the request references the first object of the plurality of objects, determining a response to the request including information about the first object.

An example electronic device comprises means for receiving a spoken input including a request, receiving an image input including a plurality of objects, selecting a reference resolution module of a plurality of reference resolution modules based on the request and the image input, determining, with the selected reference resolution module, whether the request references a first object of the plurality of objects based on at least the spoken input, and in accordance with a determination that the request references the first object of the plurality of objects, determining a response to the request including information about the first object.

Determining, with the selected reference resolution module, whether the request references a first object of the plurality of objects based on at least the spoken input allows a digital assistant to efficiently determine which object a user is referencing. For example, determining whether the request references an object in this manner allows the digital assistant to process the request without asking follow up questions and uses the data available to the digital assistant in a more complete and efficient manner. Thus, this provides for more efficient use of the electronic device (e.g., by processing the requests efficiently with less interruptions), which, additionally, reduces power usage and improves battery life of the device by enabling the user to use the device more quickly and efficiently.

DESCRIPTION

Figure 1A:
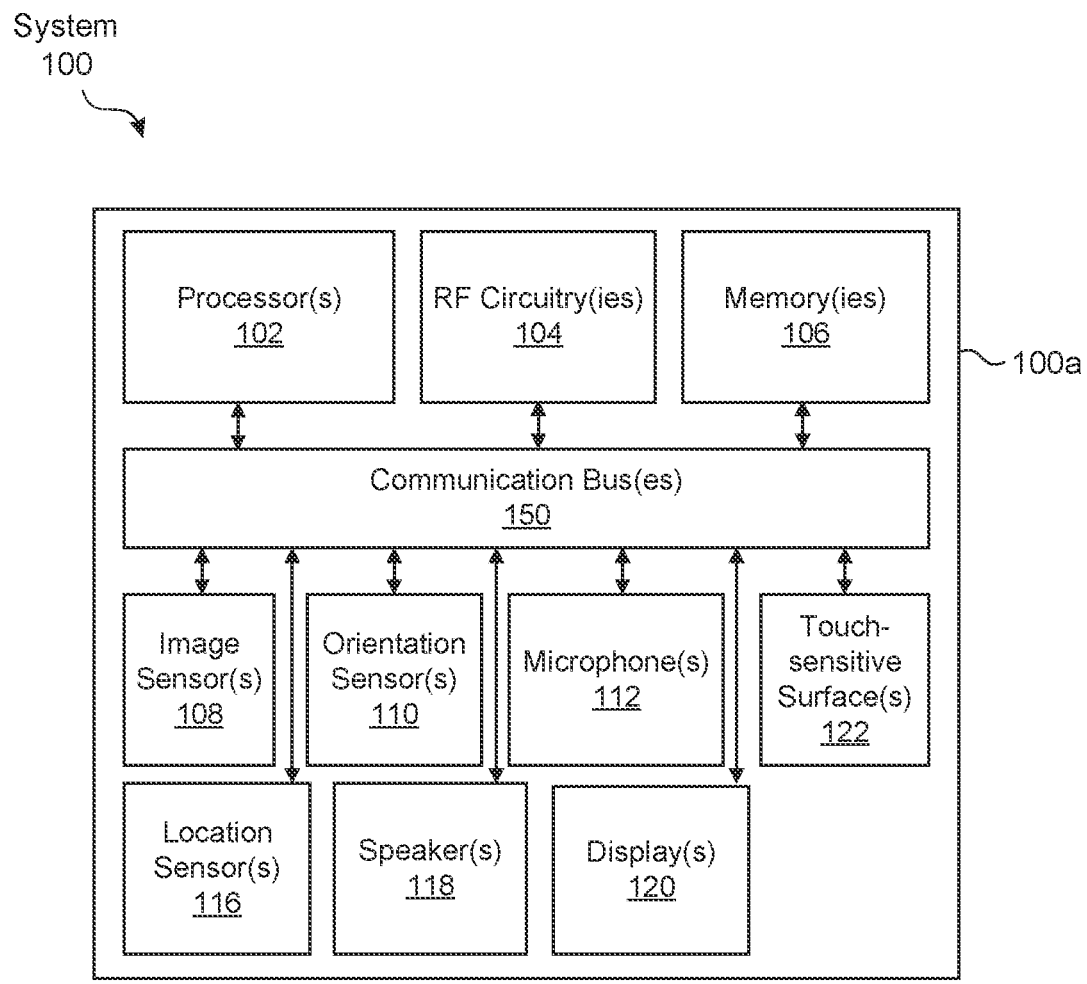
FIGS. 1A-1B depict exemplary systems for use in various computer-generated reality technologies, including virtual reality and mixed reality.

Various examples of electronic systems and techniques for using such systems in relation to various computer-generated reality technologies are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, an MR environment is anywhere between, but not including, a wholly physical environment at one end and a VR environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of MR include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An AR environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one example, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
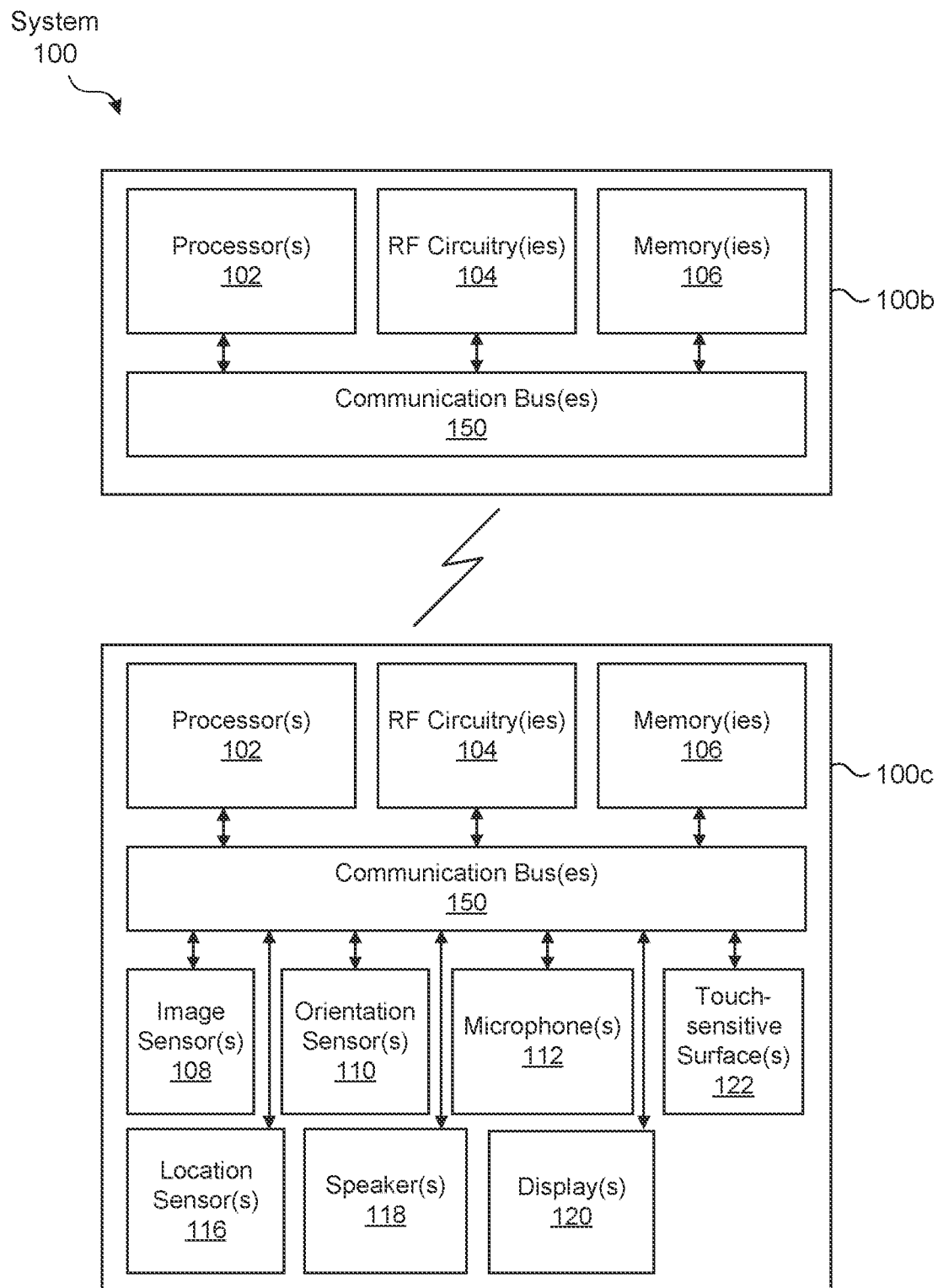

FIG. 1A and FIG. 1B depict exemplary system 100 for use in various computer-generated reality technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some examples, system 100 is a mobile device. In some examples, system 100 is a head-mounted display (HMD) device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some examples, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

Figure 2:
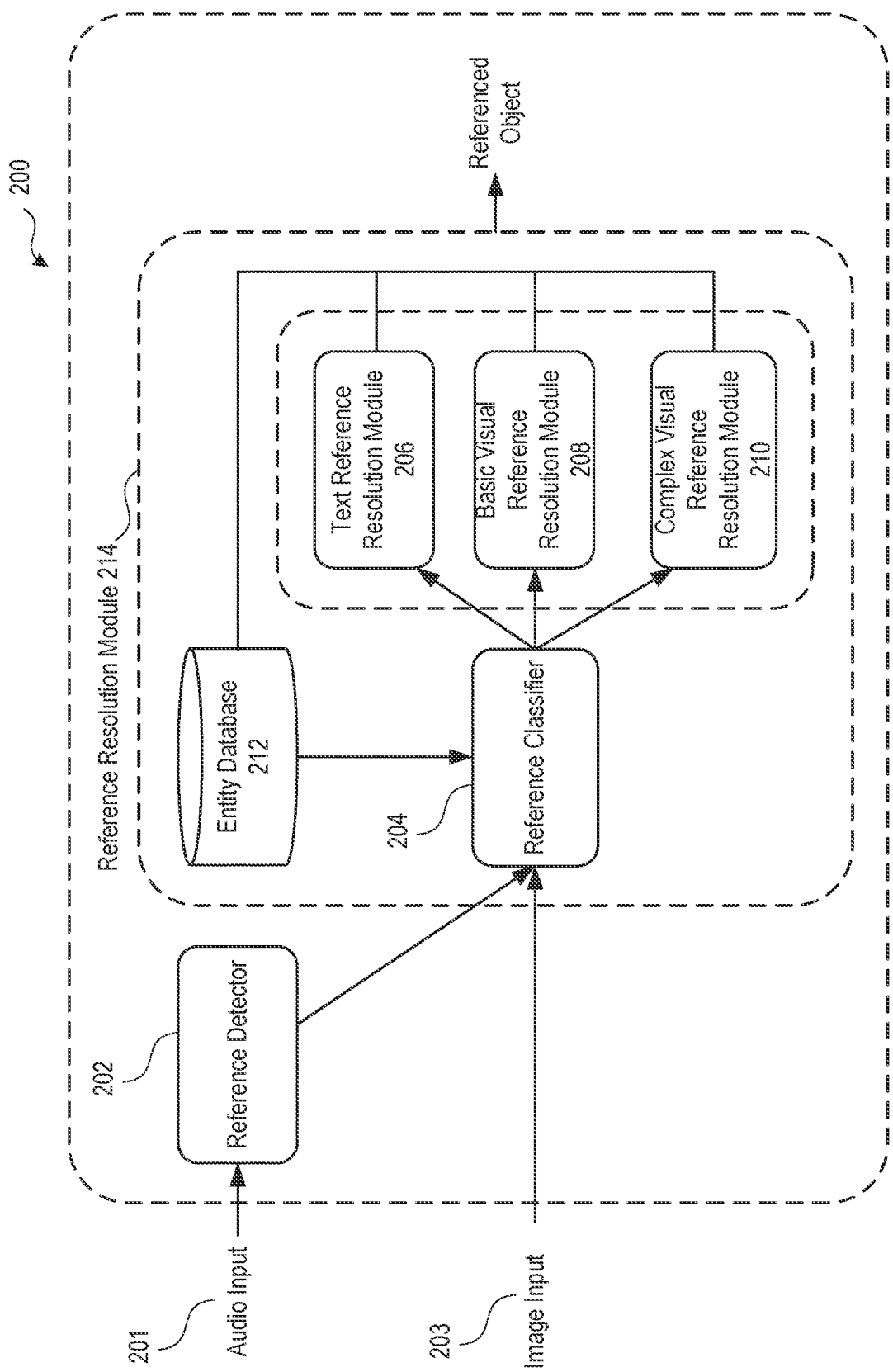
FIG. 2 depicts an exemplary digital assistant for completing an object determination process.

FIG. 2 depicts exemplary digital assistant 200 for completing an object determination process. In some examples, as illustrated in FIG. 2, digital assistant 200 includes reference detector 202, reference classifier 204, text reference resolution module 206, basic visual reference resolution module 208, complex visual reference resolution module 210, and entity database 212. In some examples, as shown in FIG. 2, reference classifier 204, text reference resolution module 206, basic visual reference resolution module 208, complex visual reference resolution module 210, and entity database 212 are included in a single reference resolution module 214.

Figure 3:
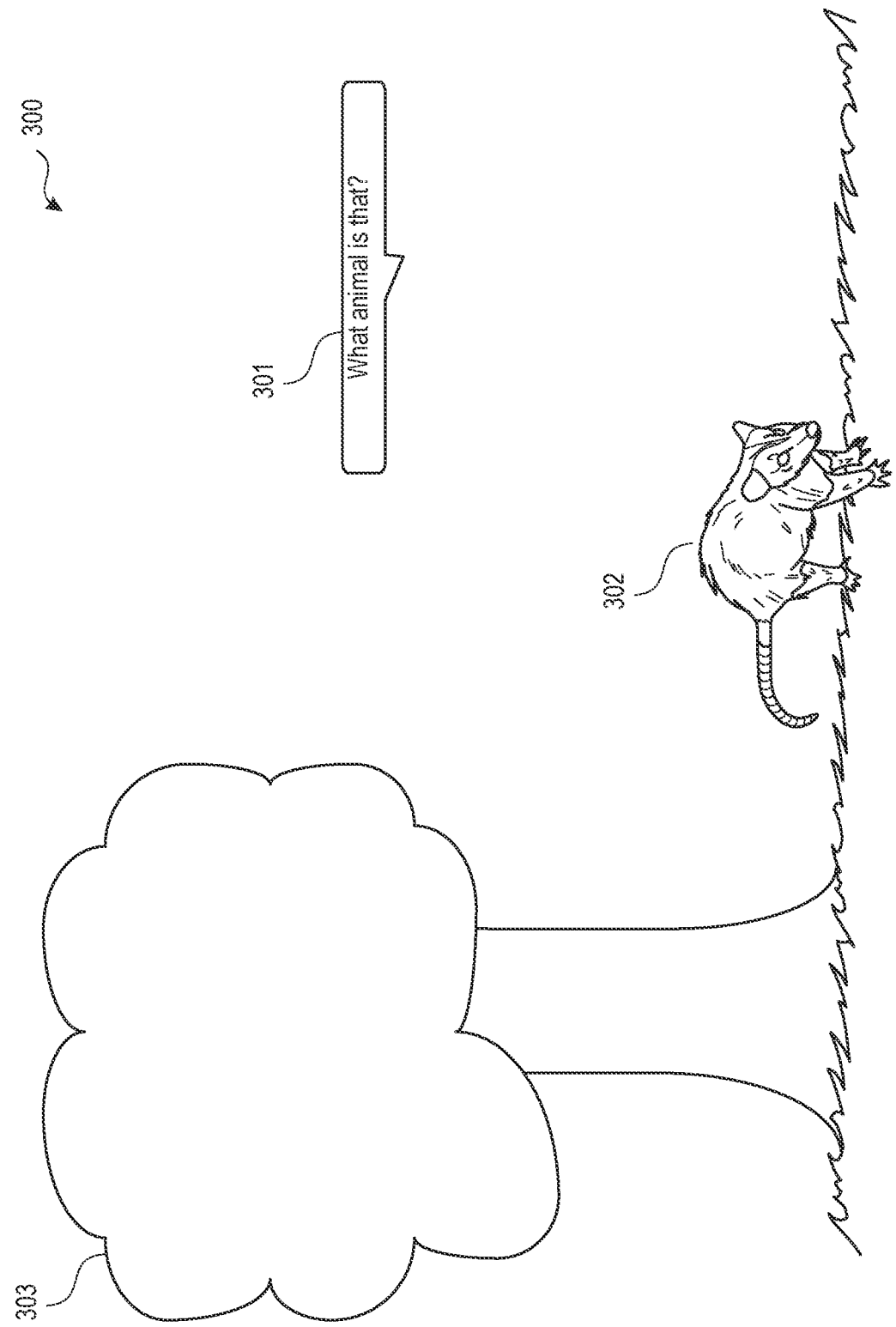
FIGS. 3-4 depict exemplary image inputs for use with the object determination process, according to various examples.
Figure 4:
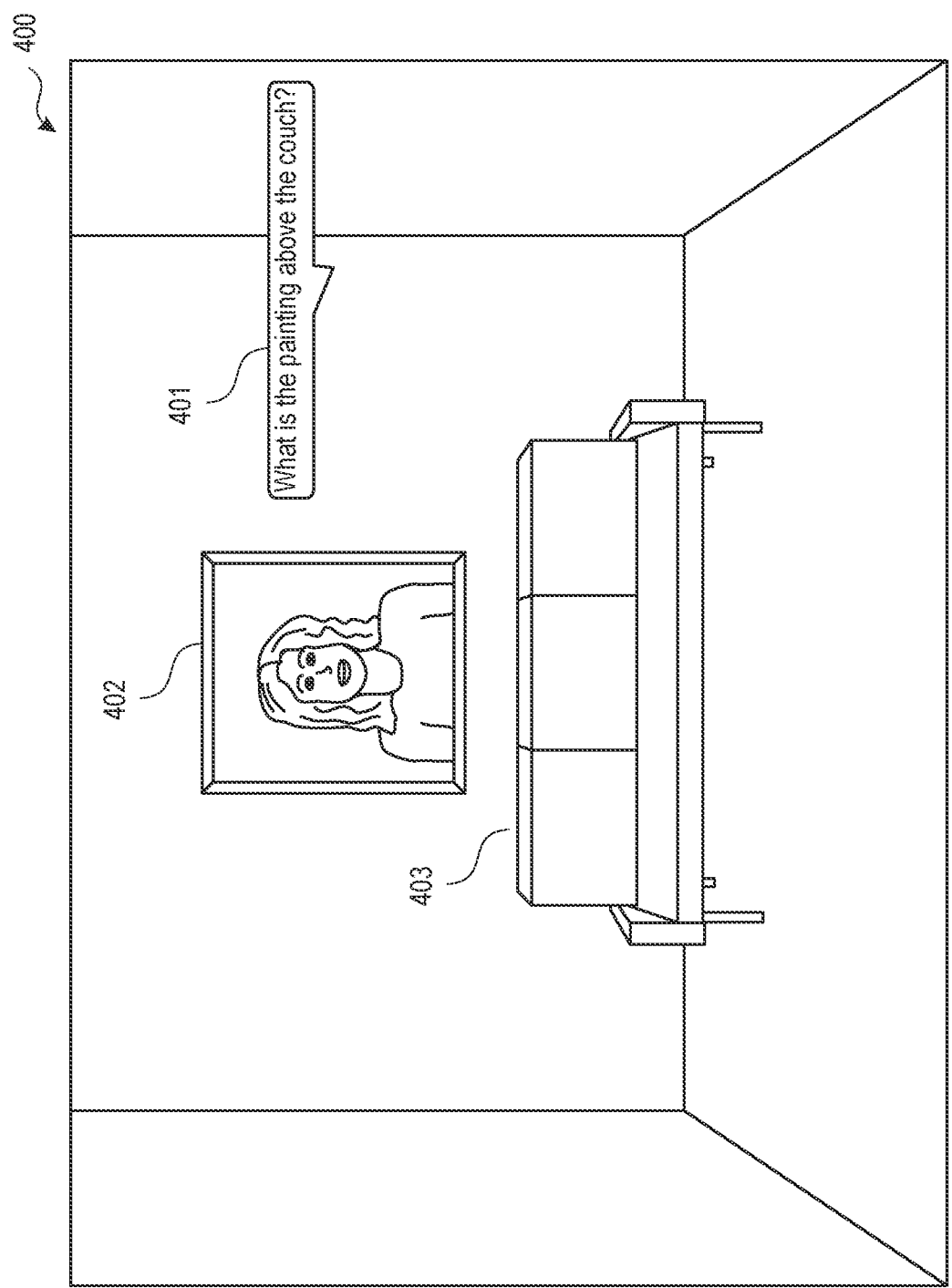

FIGS. 3 and 4 depict example image inputs for use with the object determination process, according to various examples. FIG. 3 includes spoken input 301, opossum 302, and tree 303. FIG. 4 includes spoken input 401, painting 402, and couch 403. Each of FIGS. 3 and 4 will be discussed alongside the various components of FIG. 2 and various examples of inputs that may be received by digital assistant 200.

In some examples, digital assistant 200 receives spoken input 201 and determines a plurality of user intents based on spoken input 201 by performing automatic speech recognition and/or natural language processing on spoken input 201. Accordingly, digital assistant 200 may select a user intent of the plurality of user intents and determine one or more tasks to execute based on the selected user intent. Accordingly, digital assistant 200 may receive spoken input 201 and then execute a task requested by the user based on spoken input 201.

In some examples, digital assistant 200 receives spoken input 201 and provides spoken input 201 to reference detector 202. For example, digital assistant 200 may receive spoken input 301 "What is that animal?" as shown in FIG. 3 and provide spoken input 301 to reference detector 202 for processing. In some examples, spoken input 201 includes a request such as "What is that animal?" in spoken input 301. In some examples, spoken input 201 includes audio in addition to the request. For example, spoken input 201 may include "Hey, look at that, what is that animal?" In this example, spoken input 201 includes the request "what is that animal?" and also includes the audio "Hey, look at that."

In some examples, reference detector 202 determines whether spoken input 201 includes a request. In some examples, reference detector 202 performs automatic speech recognition and/or natural language processing on spoken input 201 to determine whether spoken input 201 includes a request. Further when spoken input 201 includes a request, reference detector 202 performs automatic speech recognition and/or natural language processing on spoken input 201 to determine the request of spoken input 201. It will be understood that reference detector 202 may determine the request of spoken input 201 with another module of digital assistant 200 and/or electronic device 100.

In some examples, determining whether spoken input 201 includes a request includes performing automatic speech recognition (ASR) on spoken input 201. In particular, reference detector 202 can include one or more ASR systems that process spoken input 201 received through input devices (e.g., a microphone) of electronic device 100. The ASR systems extract representative features from the speech input. For example, the ASR systems pre-processor performs a Fourier transform on the spoken input 201 to extract spectral features that characterize the speech input as a sequence of representative multi-dimensional vectors.

Further, each ASR system of reference detector 202 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens).

In some examples, determining whether spoken input 201 includes a request includes performing natural language processing on spoken input 201. In particular, once input analyzer 202 produces recognition results containing a text string (e.g., words, or sequence of words, or sequence of tokens) through ASR, input analyzer may deduce an intent of spoken input 201. In some examples, reference detector 202 produces multiple candidate text representations of the speech input. Each candidate text representation is a sequence of words or tokens corresponding to spoken input 201. In some examples, each candidate text representation is associated with a speech recognition confidence score. Based on the speech recognition confidence scores, reference detector 202 ranks the candidate text representations and provides the n-best (e.g., n highest ranked) candidate text representation(s) to other modules of digital assistant 200 for further processing.

In some examples, determining whether spoken input 201 includes a request includes determining whether spoken input 201 includes an ambiguous term. In some examples, the ambiguous term is a deictic reference. A deictic reference is a word or phrase that ambiguously references something like an object, time, person, or place. Exemplary deictic references include but are not limited to that, this, here, there, then, those, them, he, she, etc. particularly when used with a question such as the questions "what is this?," "where is that?," and "who is he?" Accordingly, reference detector 202 determines whether the request includes one of these words or words like them and thus, whether the use of the word is ambiguous. For example, in spoken input 301 "what is that animal?" reference detector 202 may determine that "that" is a deictic reference through ASR and/or NLP. Similarly, in spoken input 401 "what is that above the couch?" reference detector 202 determines that "that" is a deictic reference. In both examples, reference detector 202 may determine "that" to be ambiguous because the user input does not include a subject or object that could be referred to with "that" or "this."

In some examples, digital assistant 200 receives image input 203. In some examples, image input 203 includes a plurality of objects. For example, image input 300 includes opossum 302 and tree 303, as shown in FIG. 3. As another example, image input 400 includes painting 402 and couch 403, as shown in FIG. 4. In some examples, image input 203 includes a view of electronic device 100. For example, when electronic device 100 is a phone (e.g., a mobile or cellular phone), the view of electronic device is the current display of a screen of electronic device 100. Thus, image input 203 is the display of the screen including objects such as opossum 302 and tree 303. In some examples, the current display of the screen of electronic device 100 is a display of an application (e.g., a camera application) and includes data provided by the application (e.g., a picture or video). In some examples, image input 203 includes a view of a user wearing electronic device 100. For example, when electronic device 100 is a head mounted or similar device image input 203 may be the view of the user and thus image input 203 may include whatever the user is looking at.

In some examples, image input 203 may include the view of electronic device 100 in a virtual reality, an augmented reality, or an augmented virtual reality as discussed above. Accordingly, in some examples, one or more of the objects included in image input 203 may be virtual objects created for or added to image input 203. Thus, digital assistant 200 may process physical and virtual objects when examining image input 203 along with spoken input 201. It will be clear that the processes described below related to reference resolution/object determination may then consider physical and virtual objects in a variety of environments including virtual reality, augmented reality, or augmented virtual reality.

In some examples, prior to receiving image input 203, digital assistant 200 determines whether to invoke a camera of electronic device 100. In some examples, digital assistant 200 determines whether to invoke the camera of electronic device 100 based on whether an affordance (e.g., a physical button or displayed button) is selected by the user. In some examples, digital assistant 200 determines whether to invoke the camera based on audio input 201. For example, digital assistant 200 may examine audio input 201 to determine whether the user is referencing something that would require a camera of electronic device 100 for digital assistant 200 to determine more information or resolve a reference of audio input 201. In some examples, digital assistant 200 may determine whether audio input 201 includes a deictic reference to determine whether more information is required to resolve a reference. In some examples, digital assistant 200 may optionally detect one or more gestures with electronic device 100 in conjunction with the deictic reference to determine whether more information is required or whether the camera of electronic device 100 is required.

In some examples, the camera of electronic device 100 is always invoked and thus digital assistant 200 may be receiving a plurality of image inputs 203 that continually update. For example, when electronic device 100 is a head mounted device or wearable heads up display, a camera or other visual sensor of electronic device 100 may be always on, and thus may receive image input 203 at all times and continually update over time.

In addition to receiving image input 203, digital assistant 200 may detect a gesture associated with spoken input 201. In some examples, digital assistant 200 detects the gesture associated with spoken input 201 by detecting the gesture in image input 203. For example, when image input 203 is a view of electronic device 100, image input 203 may include the user's hand pointing to an object or multiple objects while providing spoken input 201.

In some examples, digital assistant 200 detects the gesture associated with spoken input 201 with another sensor of electronic device 100. In some examples, the other sensor of electronic device 100 is a second camera. In some examples, the second camera is a different camera than the camera that receives image input 203. For example, when electronic device 100 is a phone that has a forward facing camera and a rear facing camera, the rear facing camera may receive image input 203, while the forward facing camera detects the user pointing in the direction of an object in image input 203, either on the screen of electronic device 100, or by determining where in the view of electronic device 100 the user is pointing.

In some examples, the other sensor of electronic device 100 is a gyroscope, accelerometer, or other sensor that detects movement of electronic device 100. Accordingly, digital assistant 200 detects a gesture associated with spoken input 201 based on data received at the gyroscope, accelerometer, or other sensor while receiving spoken input 201. For example, when electronic device 100 is a phone, the user may point the phone at an object in image input 203 while providing spoken input 201. Thus, digital assistant 200 may determine based on data from sensors like a gyroscope or an accelerometer included in electronic device 100 how electronic device 100 has moved to determine that the user pointed and in which direction.

As another example, when electronic device 100 is a wearable device like a head mounted display, the user may nod towards an object in the view of the wearable device (e.g., image input 203). Accordingly, a gyroscope, accelerometer, etc. of electronic device 100 detects data indicating the nod. Digital assistant 200 may then determine based on the data detected by the gyroscope or accelerometer in which direction the user nodded, how much they nodded, and which objects are present in image input 203 in the direction the user nodded.

Similarly to the gesture detection discussed above, in some examples, digital assistant 200 detects a user gaze associated with spoken input 201. In some examples, digital assistant 200 detects the user gaze based on image input 203. For example, when electronic device 100 is a wearable device like a head mounted display, the view of electronic device 100 is also the view of a user wearing electronic device 100. Thus, digital assistant 200 may determine the user gaze associated with spoken input 201 to be the image input 203 received with spoken input 201.

In some examples, digital assistant 200 detects the user gaze based on a sensor other than the sensor receiving image input 203. In some examples, the sensor other than the sensor receiving image input 203 is a second camera, such as a front facing camera. Thus, when electronic device 100 is a phone and the rear facing camera receives image input 203, the user may look at image input 203 on the display of electronic device 100. Accordingly, electronic device 100 may receive an image of the user's face with the front facing camera (e.g., the second camera). Based on this image digital assistant 200 can determine where in image input 203 the user is looking while providing spoken input 201, thus determining a user gaze associated with spoken input 201.

After receiving image input 203 and/or detecting the gesture or user gaze associated with spoken input 201, digital assistant 200 determines basic image features and complex image features. Basic image features are features that can be determined by digital assistant 200 through simple processing of image input 203 or other data detected (e.g., received) by electronic device 100, including any detected gestures or user gaze and contextual data. Digital assistant 200 may determine basic image features from image input 203 by performing image processing techniques such as edge detection, edge extraction, optical character recognition, image segmentation, texture analysis, motion analysis, etc. These image processing techniques can be performed through the use of machine learning models, neural networks, deep learning networks, or any other acceptable image processing software and/or module.

Exemplary basic image features include, but are not limited to, the objects in the image, text in the image, the user gaze, gestures of the user, and contextual data associated with the electronic device at the time of receiving image input 203 and/or spoken input 201.

By way of example, contextual data may indicate various characteristics of the electronic device. For instance, contextual data may indicate a location of the electronic device (e.g., GPS coordinates), whether the electronic device is connected to a network (e.g., WiFi network), whether the electronic device is connected to one or more other devices (e.g., headphones), and/or a current time, date, and/or weekday. If the electronic device is connected to a network or device, the contextual data may further indicate a name and/or type of the network or device, respectively. Thus, contextual data may indicate one or more of these or similar characteristics at the time of receiving image input 203 and/or spoken input 201.

Complex image features are features of or related to image input 203 that relate to properties of objects in image input 203 or relationships between objects in image input 203. In some examples, complex image features are determined by digital assistant 200 using a neural network, a machine learning model, or other image detection program. Accordingly, digital assistant 200 can process image input 203 to determine properties of objects like color, size, location, as well as relationships between the objects of image input 203 including whether one object is close or far from another object, whether one object is bigger than another object, whether electronic device 100 or the user is close to an object of image input 203, etc.

For example, when digital assistant 200 receives image input 300, digital assistant 200 may determine complex image features including that opossum 302 is close to tree 303, that opossum 302 is to the right of tree 303, that opossum 302 is not in tree 303, that the user is closer to tree 303 than opossum 302, etc. As another example, when digital assistant 200 receives image input 400, digital assistant 200 may determine complex image features including that picture 402 is above couch 403, that couch 403 is against a wall, that painting 402 is close to couch 403, etc.

Digital assistant 200 provides spoken input 201 and image input 203 to reference classifier 204 so that reference classifier 204 can select a reference resolution module from a plurality of reference resolution modules based on the request of spoken input 201 and image input 203. In some examples, the plurality of reference resolution modules includes text reference resolution module 206, basic visual reference resolution module 208, and complex visual reference resolution module 210, as shown in FIG. 2. In some examples, digital assistant 200 provides the basic image features, the complex image features, and historical interaction data between the user and digital assistant 200 to reference classifier 204 in addition to spoken input 201 and image input 203.

Reference classifier 204 selects from text reference resolution module 206, basic visual reference resolution module 208, and complex visual reference resolution module 210 by determining which reference resolution module will be able to complete the object determination process (e.g., determine which object in image input 203 the request of spoken input 201 references). Each of text reference resolution module 206, basic visual reference resolution module 208, and complex visual reference resolution module 210 may complete the object determination process by examining different inputs and factors to determine which object of image input 203 the user is referencing with spoken input 201.

Accordingly, reference classifier 204 selects one or more of the three reference resolution modules by determining which of the inputs and/or factors are present in the current sets of inputs and thus, determining which of the three reference resolution modules will be most likely to be able to complete the object determination process. In some examples, reference classifier 204's selection of text reference resolution module 206, basic visual reference resolution module 208, or complex visual reference resolution module 210 is based on a plurality of confidence scores determined by reference classifier 204.

Reference classifier 204 may determine the confidence scores based on spoken input 201, image input 203, historical interaction data, basic image features, and/or complex image features. For example, reference classifier 204 may assign certain weights or values to words that do or do not appear in spoken input 201. Similarly, reference classifier 204 may assign certain weights based on certain basic or complex image features that occur in image input 203 and whether spoken input 201 references one or more of the basic or complex image features.

Accordingly, reference classifier 204 can calculate the confidence scores based on one or more of the weights assigned to each of these factors (e.g., by adding together the various weights, multiplying the weights, etc.). In particular, in some examples, each of text reference resolution module 206, basic visual reference resolution module 208, and complex visual reference resolution module 210 are associated with a different confidence score of the plurality of confidence scores. Further, each of the confidence scores may be determined based on different combinations of the factors discussed above.

In some examples, the historical interaction data between the user and digital assistant 200 includes past conversations, interactions, and/or requests that the user has had with digital assistant 200. In some examples, the historical interaction data between the user and digital assistant 200 includes relationships of deictic references provided in spoken inputs by the user and objects provided in response by digital assistant 200 (e.g., "what animal is that?" and "opossum" respectively) which are stored in entity database 212.

The confidence score associated with text reference resolution module 206 is a likelihood that the object determination process can be completed based on spoken input 201 and the historical interaction data, including relationships stored in entity database 212. For example, when a user provides an spoken input including the request "what do they eat?," and digital assistant 200 receives an image input that does not include any objects or image features, reference classifier 204 may determine that the user is intending to reference a past interaction with digital assistant 200. Thus, reference classifier 204 can determine that it is likely the object determination process can be completed based on the current spoken input of "what do they eat?" and the relationships/historical interactions stored in entity data base 212. Accordingly, reference classifier 204 may calculate a high likelihood that the object determination process can be completed based on spoken input 201 and the historical interaction data and thus, a high confidence score associated with text reference resolution module 206.

The confidence score associated with basic visual reference resolution module 208 is a likelihood that the object determination process can be completed based on at least spoken input 201 and basic image features determined by digital assistant 200. For example, when a user provides spoken input 301 "what animal is that?," and digital assistant 200 receives image input 300, digital assistant 200 may determine that basic image features of image input 300 include opossum 302 and tree 303 as discussed above. Accordingly, reference classifier 204 can determine that because the word "animal" is provided in the input and there is an object that is an animal included in image input 300 (e.g., opossum 302) it is likely the object determination process can be completed based on the spoken input and the basic image features. Thus reference classifier 204 may calculate a high likelihood that the object determination process can be completed based on spoken input 201 and image input 300 and thus, a high confidence score associated with basic visual reference resolution module 208.

In some examples, the confidence score associated with basic visual reference resolution module 208 also considers whether the object determination process can be completed based on historical interaction data, in addition to spoken input 201 and the basic image features. For example, when a user provides the spoken input "what about that one?," digital assistant 200 may receive an image input that includes the basic image feature of a raccoon. Reference classifier 204 may then determine that based on the input "that one" the user is referencing a previous conversation with digital assistant 200. Accordingly, reference classifier 204 may determine that it is likely the object determination process can be completed based on the spoken input, the historical interaction, and the basic features of the current image input (e.g., the raccoon). Thus, reference classifier 204 can determine a high confidence score associated with basic visual reference resolution module 208.

The confidence score associated with complex visual reference resolution module 210 is a likelihood that the object determination process can be completed based on at least spoken input 201 and complex image features determined by digital assistant 200. For example, when a user provides spoken input 401 "what is the painting above the couch?," and digital assistant 200 receives image input 400, digital assistant 200 may determine that complex image features of image input 400 include the relationship between painting 402 and couch 403, as discussed above. Accordingly, reference classifier 204 may determine that it is likely the object determination process can be completed based on "above the couch" included in input 401 and the determined complex image features of image input 400. Thus, reference classifier 204 can determine a high confidence score associated with complex visual reference resolution module 210.

In some examples, the confidence score associated with complex visual reference resolution module 210 also considers whether the object determination process can be completed based on historical interaction data and basic image features, in addition to spoken input 201 and the complex image features. For example, when the user provides the spoken input "who painted the one on the left?" after the previous interaction about the painting above the couch, reference classifier 204 may determine that it is likely the object determination process can be completed based on the current spoken input, the historical interaction data (e.g., that the user previously referenced a different painting), and complex image features of an image input. Thus, reference classifier 204 can determine a high confidence score associated with complex visual reference resolution module 210.

After determining the confidence scores, reference classifier 204 determines whether one or more of the confidence scores exceed an associated predetermined threshold. In some examples, there is a predetermined threshold associated with each of text reference resolution module 206, basic visual reference resolution module 208, and complex visual reference resolution module 210. Thus, when the confidence score exceeds one of the predetermined thresholds associated with a particular reference resolution module, reference classifier 204 selects the associated reference resolution module for the object determination process.

For example, when the user provides spoken input 301 "what animal is that?," and digital assistant 200 receives image input 300, reference classifier 204 may determine a confidence score associated with each of text reference resolution module 206, basic visual reference resolution module 208, and complex visual reference resolution module 210. As discussed above, reference classifier 204 may determine that it is likely the object determination process can be completed based on the spoken input and the basic image features, and further that it is not likely the object determination process can be completed based on the historical interaction data or the complex image features. Accordingly, reference classifier 204 may determine a high confidence score associated with basic visual reference resolution module 208 and low confidence scores associated with text reference resolution module 206 and complex visual reference resolution module 210. Reference classifier 204 then determines that the confidence score associated with basic visual reference resolution module 208 exceeds a predetermined threshold and selects basic visual reference resolution module 208 for the object determination process.

As another example, when the user provides spoken input 401 "what is that above the couch?," and digital assistant 200 receives image input 400, reference classifier 204 may determine that it is likely the object determination process can be completed based on the spoken input and the complex image features, and further that it is not likely the object determination process can be completed based on the historical interaction data or the basic image features. Accordingly, reference classifier 204 may determine a high confidence score associated with complex visual reference resolution module 210 and low confidence scores associated with text reference resolution module 206 and basic visual reference resolution module 208. Reference classifier 204 then determines that the confidence score associated with complex visual reference resolution module 210 exceeds a predetermined threshold and selects complex visual reference resolution module 210 for the object determination process.

After selecting one of text reference resolution module 206, basic visual reference resolution module 208, and complex visual reference resolution module 210, reference classifier 204 provides spoken input 201, image input 203, basic image features, complex image features, and historical interaction data to the selected reference resolution module.

After being selected by reference classifier 204, text reference resolution module 206 completes the object determination process by examining the current spoken input 201 and the historical interaction data between the user and digital assistant 200 to determine which object the request references. As an example, the user may provide an spoken input including the request "what do they eat?," after an interaction in which the user provided the request "what animal is that?" and digital assistant 200 responded with "that animal is an opossum." Thus, text reference resolution module 206 may determine based on the previous exchange between the user and digital assistant 200 that the object the current user request is referencing is the opossum. Accordingly, digital assistant 200 may determine an appropriate response to the user based on the request and the determined object as discussed further below.

As another example, the user may provide a spoken input including the request "what was that animal by the tree again?" Text reference resolution module 206 may examine entity database 212 to determine which objects have relationships with the terms animal, that, or tree to determine which object the user is references. Accordingly, text reference resolution module 206 may determine that entity database 212 includes the a stored relationship between the object "opossum" and one or more of those terms and thus determine that the object the current user request is references is the opossum.

After being selected by reference classifier 204, basic visual reference resolution module 208 completes the object determination process by examining the spoken input 201, the basic image features, and optionally, the historical interaction data, to determine which object the request references. As an example, basic visual reference resolution module 208 may receive spoken input 301 "what animal is that?" along with the basic image features of image input 300 including the objects opossum 302 and tree 303. Accordingly, basic visual reference resolution module 208 may determine that based on the use of "animal" in the input the user is referencing opossum 302 included in image input 300 because tree 303 is not an animal. Accordingly, digital assistant 200 may determine an appropriate response to the user based on the determined object of opossum 302.

In some examples, as discussed above, the basic image features include contextual data associated with the electronic device at the time of receiving image input 203 and/or spoken input 201. Accordingly, basic visual reference resolution module 208 completes the object determination process by examining the spoken input 201 along with the contextual data associated with the electronic device. For example, basic visual reference resolution module 208 may receive the spoken input "where is this?" along with image input 203 including a set of buildings and contextual data of electronic device 100 indicating the user's current location is in Palo Alto, California. Accordingly, basic visual reference resolution module 208 may determine that the user is intending to reference the general location of the buildings and thus that "this" in the input references Palo Alto, California.

In some examples, as discussed above, the basic image features include a detected gesture or gaze of a user while receiving spoken input 201. Accordingly, basic visual reference resolution module 208 completes the object determination process by examining the spoken input 201 along with the detected gaze and/or gesture. In some examples, examining the spoken input 201 along with the detected gaze and/or gesture includes determining a type of the gesture. Exemplary types of gestures include pointing, waving, pushing, pulling, nodding, and any other types of gesture which could indicate an object. In some examples, basic visual reference resolution module 208 determines based on the type of gesture and image input 203 (e.g., basic image features of image input 203) whether the gesture references an object of image input 203.

For example, basic visual reference resolution module 208 may receive the spoken input "what is that?" along with data indicating that the user pointed at a cat of image input 203. Accordingly, basic visual reference resolution module 208 determines that the user is referencing the cat with the reference "that" in the spoken input and digital assistant 200 may determine the appropriate response the user. As another example, basic visual reference resolution module 208 may receive the spoken input "what's over there?" along with data indicating that the user nodded towards a mountain range of image input 203. Accordingly, basic visual reference resolution module 208 determines that the user is referencing the mountain range with the reference "there" in the spoken input.

In some examples, determining whether the gesture references an object of image input 203 is based on when the gesture is detected while receiving spoken input 201. For example, basic visual reference resolution module 208 may receive the spoken input "what do they eat?" along with data indicating that the user pointed at a cat of image input 203 while saying "they." Accordingly, basic visual reference resolution module 208 determines that the user is referencing the cat with the reference "they" in the spoken input. As another example, basic visual reference resolution module 208 may receive the same spoken input "what do they eat?" along with data indicating that the user waved across their face after saying "eat." Accordingly, basic visual reference resolution module 208 determines that the user is not indicating any objects of image input 203 with the wave. Thus, basic visual reference resolution module 208 (or another reference resolution module) may determine the object the user is referencing without examining the detected gesture.

Similarly to the examples discussed above with respect to a detected gesture, basic visual reference resolution module 208 may determine whether a detected gaze references an object of image input 203. As discussed above, digital assistant 200 detects the gaze of the user based on where a camera of electronic device 100 is pointed and/or based on a portion of a display of electronic device 100 the user is looking at. Accordingly, basic visual reference resolution module 208 may examine the detected gaze of the user along with the spoken input 201 to determine which object of image input 203 the spoken input is referencing.

For example, basic visual reference resolution module 208 may receive spoken input 301 "what is that?" along with data indicating that the user gaze is directed at opossum 302 of image input 300. Accordingly, basic visual reference resolution module 208 determines that the user is referencing opossum 302 with the reference "that" in the spoken input and digital assistant 200 may determine the appropriate response to the user.

In some examples, determining whether the gaze references an object of image input 203 is based on when the gaze is detected while receiving spoken input 201. For example, basic visual reference resolution module 208 may receive the spoken input "what do they eat?" along with data indicating that the user's gaze is directed at opossum 302 of image input 300 while saying "they." Accordingly, basic visual reference resolution module 208 determines that the user is referencing opossum 302 with the reference "they" in the spoken input. As another example, basic visual reference resolution module 208 may receive the same spoken input "what do they eat?" along with data indicating that the user's gaze is not directed at any particular object during the entire input. Accordingly basic visual reference resolution module 208 determines that the user is not indicating any objects of image input 300 with the user's gaze. Thus, basic visual reference resolution module 208 (or another reference resolution module) may determine the object the user is referencing without examining the detected gaze.

After being selected by reference classifier 204, complex visual reference resolution module 210 completes the object determination process by examining the spoken input 201, the complex image features, and optionally, the historical interaction data, and basic image features, to determine which object the request references. As an example, complex visual reference resolution module 210 may receive spoken input 401 "what is that above the couch?," along with the complex image features of image input 400 including a relationship between painting 402 and couch 403. Accordingly, complex visual reference resolution module 210 may determine that based on the relationship described in the input "above the couch" and the determined complex image feature that there is one object above the couch that painting 402 is the object being referenced by the user. Accordingly digital assistant 200 may determine an appropriate response to the user based on the determined object of panting 402.

As another example, complex visual reference resolution module 210 may receive the spoken input "who is that in the red shirt?" along with complex image features of image input 203 including that there is one person wearing a red shirt. Accordingly, complex visual reference resolution module 210 determines based on the use of "red" in the spoken input and the complex image features that the person wearing a red shirt is the object of image input 203 being referenced by the user. As yet another example, complex visual reference resolution module 210 may receive the spoken input "who is the person wearing the red shirt to the left of the podium?" along with complex image features of image input 203 including that there are several people wearing red shirts and their relative positions in relation to the podium of image input 203. Accordingly complex visual reference resolution module 210 determines based on the complex image features which person is to the left of the podium and wearing red, as referenced by the spoken input.

In some examples, each of text reference resolution module 206, basic visual reference resolution module 208, and complex visual reference resolution module 210 may complete the object determination process by determining whether the request of spoken input 201 references one object of the plurality of objects present in image input 203. Further, if the selected reference resolution module determines that the request does not reference that object, the selected reference resolution module may repeat this process for each object of the plurality of objects present in image input 203. Further, as discussed above, the selected reference resolution module may repeat this process for objects included in the historical interaction data.

In some examples, after the selected reference resolution module determines which object the request of spoken input 201 is referencing, digital assistant 200 stores the relationship between the reference and the object in entity database 212. In some examples, digital assistant 200 stores the relationship between the reference and the object in the historical interaction data. For example, after basic visual reference resolution module 208 determines that the user is referencing opossum 302 with the request "what animal is that?," digital assistant 200 stores the relationship between "that" and opossum 302 in entity data base 212.

This allows digital assistant 200 to reference the previous requests and historical interaction data when processing further requests provided by the user. For example, as discussed above, the user may provide the request "what do they eat?" after the previous exchange about opossum 302. Digital assistant 200 may reference the previously stored relationship and interaction data to determine that the user is referencing opossum 302 with "the" y.

In some examples, after the selected reference resolution module determines which object the request of spoken input 201 is referencing digital assistant 200 determines a response to the request including information about the referenced object. After determining the response digital assistant 200 may provide the determined response as an audio output. For example, after digital assistant 200 determines that the user is referencing opossum 302, digital assistant 200 may provide the response "that animal is an opossum." The digital assistant 200 may further include information about the object, like where the opossum is native, what opossums eat, etc. Thus, digital assistant 200 may provide the response "that animal is an opossum, they are native to this area." As another example, after digital assistant 200 determines that the user is referencing picture 402 in the input "what is that above the couch?", digital assistant may provide the response "that painting is the Mona Lisa, it was painted by Leonardo da Vinci."

In some examples, as discussed above, the response to the request references the request. In some examples, the response references the request by including speech that resembles the input. For example, in response to "what animal is that?" the output may be "that animal is . . . ." In this way digital assistant 200 references the request of the user to make it clear which subject digital assistant 200 is discussing. In some examples, the response references the request by including the request or a paraphrase of the request in the response.

In some examples, the response to the request includes a picture of the referenced object. In some examples, the picture of the referenced object is image input 203 or a portion of 203. For example, in response to the request "what animal is that?" digital assistant 200 may provide a cropped version of image input 300 that includes only opossum 302 along with the response "that is an opossum." In some examples, the picture of the referenced object is a picture that digital assistant 200 determines from an external source such as a database of images or a web search of the referenced object. Thus, digital assistant 200 may provide a different picture of an opossum retrieved from a web search along with the response.

Figure 5:
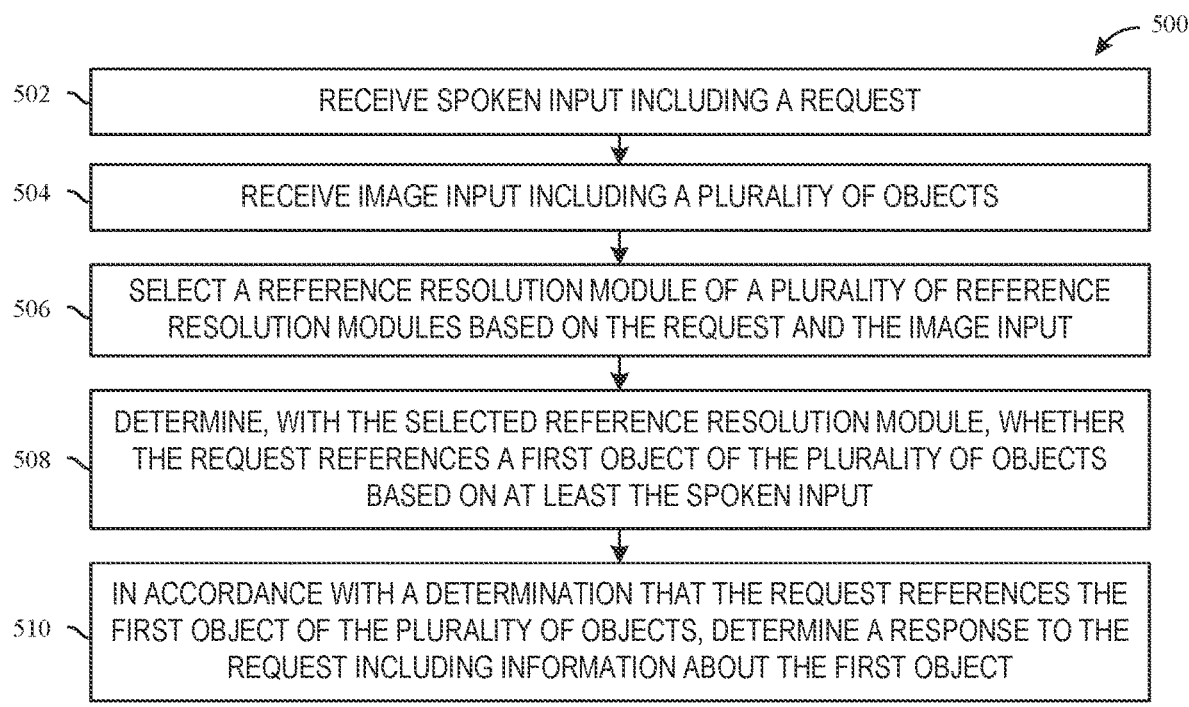
FIG. 5 is a flow diagram illustrating a process for determining an object, according to various examples.

FIG. 5 is a flow diagram illustrating a process for determining an object, according to various examples. Method 500 is performed at a device (e.g., device 100) with one or more input devices (e.g., a touchscreen, a mic, a camera), and a wireless communication radio (e.g., a Bluetooth connection, WiFi connection, a mobile broadband connection such as a 4G LTE connection). In some embodiments, the electronic device includes a plurality of cameras. In some embodiments, the electronic device includes only one camera. In some examples, the device includes one or more biometric sensors which, optionally, include a camera, such as an infrared camera, a thermographic camera, or a combination thereof. Some operations in method 900 are, optionally, combined, the orders of some operations are, optionally, changed, and some operations are, optionally, omitted.

At block 502, a spoken input (e.g., spoken input 201, spoken input 301, spoken input 401) including a request is received. In some examples, whether the request includes a deictic reference is determined. At block 504, an image input (e.g., image input 203, image input 300, image input 400) including a plurality of objects (e.g., opossum 302, tree 303, painting 402, couch 403) is received. In some examples, prior to receiving the image input, whether to invoke a camera of the electronic device (e.g., electronic device 100) is determined.

At block 506, a reference resolution module (e.g., text reference resolution module 206, basic visual reference resolution module 208, complex visual reference resolution module 210) of a plurality of reference resolution modules is selected based on the request and the image input (e.g., image input 203, image input 300, image input 400). In some examples, selecting a reference resolution module of a plurality of reference resolution modules based on the request and the image input further comprises determining whether the object determination process can be completed based on the spoken input and a historical interaction data (e.g., with a confidence score and a predetermine threshold). In some examples, in accordance with a determination that the object determination process can be completed based on the spoken input and a historical interaction data, a first reference resolution module (e.g., text reference resolution module 206, basic visual reference resolution module 208, complex visual reference resolution module 210) of the plurality of reference resolution modules is selected.

In some examples, a gesture associated with the spoken input (e.g., spoken input 201, spoken input 301, spoken input 401) is detected. In some examples, a user gaze associated with the spoken input is detected. In some examples, basic image features of the image input (e.g., image input 203, image input 300, image input 400) are determined. In some examples, complex image features of the image input are determined. In some examples, the basic image features include the gesture of the user and the gaze of the user. In some examples, the complex image features include a relationship between the plurality of objects (e.g., opossum 302, tree 303, painting 402, couch 403) of the image input.

In some examples, in accordance with a determination that the object (e.g., opossum 302, tree 303, painting 402, couch 403) determination cannot be completed based on the spoken input (e.g., spoken input 201, spoken input 301, spoken input 401) and the historical interaction data, whether the object determination can be completed based on the spoken input and the basic image features is determined. In some examples, in accordance with a determination that the object determination can be completed based on the spoken input and the basic image features, a second reference resolution module (e.g., text reference resolution module 206, basic visual reference resolution module 208, complex visual reference resolution module 210) of the plurality of reference resolution modules is selected.

In some examples, in accordance with a determination that the object determination (e.g., opossum 302, tree 303, painting 402, couch 403) cannot be completed based on the spoken input (e.g., spoken input 201, spoken input 301, spoken input 401) and the basic image features, whether the object determination can be completed based on the spoken input and the complex image features is determined. In some examples, in accordance with a determination that the object determination can be completed based on the spoken input and the complex image features, a third reference resolution module (e.g., text reference resolution module 206, basic visual reference resolution module 208, complex visual reference resolution module 210) of the plurality of reference resolution modules is selected.

At block 508, whether the request references a first object (e.g., opossum 302, tree 303, painting 402, couch 403) of the plurality of objects is determined with the selected reference resolution module (e.g., text reference resolution module 206, basic visual reference resolution module 208, complex visual reference resolution module 210) based on at least the spoken input (e.g., spoken input 201, spoken input 301, spoken input 401).

In some examples, the selected reference resolution module (e.g., text reference resolution module 206, basic visual reference resolution module 208, complex visual reference resolution module 210) is the first reference resolution module, and the determination of whether the request references the first object (e.g., opossum 302, tree 303, painting 402, couch 403) is based on the spoken input (e.g., spoken input 201, spoken input 301, spoken input 401) and the historical interaction data.

In some examples, the selected reference resolution module (e.g., text reference resolution module 206, basic visual reference resolution module 208, complex visual reference resolution module 210) is the second reference resolution module, and the determination of whether the request references the first object (e.g., opossum 302, tree 303, painting 402, couch 403) is based on the spoken input (e.g., spoken input 201, spoken input 301, spoken input 401) and the basic image features.

In some examples, the selected reference resolution module (e.g., text reference resolution module 206, basic visual reference resolution module 208, complex visual reference resolution module 210) is the third reference resolution module, and the determination of whether the request references the first object (e.g., opossum 302, tree 303, painting 402, couch 403) is based on the spoken input (e.g., spoken input 201, spoken input 301, spoken input 401) and the complex image features.

In some examples, a type of gesture is determined and whether the gesture references the first object (e.g., opossum 302, tree 303, painting 402, couch 403) of the plurality of objects is determined based on the type of gesture and the image input (e.g., image input 203, image input 300, image input 400). In some examples, whether the gesture references the first object of the plurality of objects is based on when the gesture is detected during the spoken input (e.g., spoken input 201, spoken input 301, spoken input 401).

In some examples, detecting the gaze is based on a portion of a display of the electronic device (e.g., electronic device 100) that the user is looking at. In some examples, detecting the gaze of the user is based on where the camera of the electronic device is pointed. In some examples, whether the gaze references the first object (e.g., opossum 302, tree 303, painting 402, couch 403) of the plurality of objects is determined based on the gaze of the user. In some examples, whether the gaze references the first object of the plurality of objects is based on when the gaze is detected during the spoken input (e.g., spoken input 201, spoken input 301, spoken input 401).

At block 510 in accordance with a determination that the request references the first object (e.g., opossum 302, tree 303, painting 402, couch 403) of the plurality of objects, a response to the request including information about the first object is determined.

In some examples, in accordance with a determination that the request does not reference the first object (e.g., opossum 302, tree 303, painting 402, couch 403) of the plurality of objects whether the request references a second object (e.g., opossum 302, tree 303, painting 402, couch 403) of the plurality of objects based on at least the spoken input (e.g., spoken input 201, spoken input 301, spoken input 401) is determined with the selected reference resolution module (e.g., text reference resolution module 206, basic visual reference resolution module 208, complex visual reference resolution module 210). In some examples, in accordance with a determination that the request references the second object of the plurality of objects, the response to the request including information about the second object is determined.

In some examples, the response to the request includes a picture of the object (e.g., opossum 302, tree 303, painting 402, couch 403). In some examples, the response references the request. In some examples, the relationship between the reference and the object is stored in historical interaction data (e.g., entity database 212).

As described above, one aspect of the present technology is the gathering and use of data available from various sources to reference and object determination of a request. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver accurate reference resolution that is of greater interest to the user. Accordingly, use of such personal information data enables users to calculated control of reference resolution. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of image capture, the present technology can be configured to allow users to select to "opt in" or "opt out" of participation in the collection of personal information data during registration for services or anytime thereafter. In another example, users can select to limit the length of time images and/or requests is maintained or entirely prohibit the development of entity databases. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, reference resolution can be determined by inferring preferences based on non-personal information data or a bare minimum amount of personal information, such as non-personal information available to the reference resolution modules, or publicly available information.

What is claimed is:

1. A non-transitory computer-readable storage medium storing one or more programs, the one or more programs comprising instructions, which when executed by one or more processors of an electronic device, cause the electronic device to:
   receive a spoken input including a request;
   receive an image input including a plurality of objects;
   select a reference resolution module of a plurality of reference resolution modules based on whether the reference resolution module of the plurality of reference resolution modules is capable of determining an object of the plurality of objects based on a first set of factors and a second set of factors included in the request and the image input;
   determine, with the selected reference resolution module, whether the request references a first object of the plurality of objects based on at least the spoken input; and in accordance with a determination that the request references the first object of the plurality of objects, determine a response to the request including information about the first object.

2. The non-transitory computer-readable storage medium of claim 1, the one or more programs further comprising instructions, which when executed by one or more processors of the electronic device, cause the electronic device to:
prior to receiving the image input, determine whether to invoke a camera of the electronic device.

3. The non-transitory computer-readable storage medium of claim 1, the one or more programs further comprising instructions, which when executed by one or more processors of the electronic device, cause the electronic device to:
determine whether the request includes a deictic reference.

4. The non-transitory computer-readable storage medium of claim 1, wherein selecting the reference resolution module of the plurality of reference resolution modules based on whether the reference resolution module of the plurality of reference resolution modules is capable of determining an object of the plurality of objects based on a first set of factors and a second set of factors included in the request and the image input further comprises:
determining whether the object determination can be completed based on the spoken input and a historical interaction data; and
in accordance with a determination that the object determination can be completed based on the spoken input and the historical interaction data, selecting a first reference resolution module of the plurality of reference resolution modules.

5. The non-transitory computer-readable storage medium of claim 4, wherein the selected reference resolution module is the first reference resolution module, and wherein the determination of whether the request references the first object is based on the spoken input and the historical interaction data.

6. The non-transitory computer-readable storage medium of claim 1, the one or more programs further comprising instructions, which when executed by one or more processors of the electronic device, cause the electronic device to:
detect a gesture associated with the spoken input.

7. The non-transitory computer-readable storage medium of claim 1, the one or more programs further comprising instructions, which when executed by one or more processors of the electronic device, cause the electronic device to:
detect a user gaze associated with the spoken input.

8. The non-transitory computer-readable storage medium of claim 6, the one or more programs further comprising instructions, which when executed by one or more processors of the electronic device, cause the electronic device to:
determine basic image features of the image input; and
determine complex image features of the image input.

9. The non-transitory computer-readable storage medium of claim 8, wherein the basic image features include the gesture of the user and the gaze of the user.

10. The non-transitory computer-readable storage medium of claim 8, wherein the complex image features include a relationship between the plurality of objects of the image input.

11. The non-transitory computer-readable storage medium of claim 10, wherein selecting the reference resolution module of the plurality of reference resolution modules based on whether the reference resolution module of the plurality of reference resolution modules is capable of determining an object of the plurality of objects based on a first set of factors and a second set of factors included in the request and the image input further comprises:
in accordance with a determination that the object determination cannot be completed based on the first set of factors and the second set of factors:
determining whether the object determination can be completed based on the spoken input and the basic image features, wherein the basic image features are included in a third set of factors; and
in accordance with a determination that the object determination can be completed based on the spoken input and the basic image features, selecting a second reference resolution module of the plurality of reference resolution modules.

12. The non-transitory computer-readable storage medium of claim 11, wherein selecting the reference resolution module of the plurality of reference resolution modules based on whether the reference resolution module of the plurality of reference resolution modules is capable of determining an object of the plurality of objects based on a first set of factors and a second set of factors included in the request and the image input further comprises:
in accordance with the determination that the object determination cannot be completed based on the first set of factors and the third set of factors:
determining whether the object determination can be completed based on the spoken input and the complex image features, wherein the complex image features are included in a fourth set of factors; and
in accordance with a determination that the object determination can be completed based on the spoken input and the complex image features, selecting a third reference resolution module of the plurality of reference resolution modules.

13. The non-transitory computer-readable storage medium of claim 12, wherein the selected reference resolution module is the second reference resolution module, and wherein the determination of whether the request references the first object of the plurality of objects is based on the spoken input and the basic image features.

14. The non-transitory computer-readable storage medium of claim 12, wherein the selected reference resolution module is the third reference resolution module, and wherein the determination of whether the request references the first object of the plurality of objects is based on the spoken input and the complex image features.

15. The non-transitory computer-readable storage medium of claim 6, the one or more programs further comprising instructions, which when executed by one or more processors of the electronic device, cause the electronic device to:
determine a type of the gesture; and
determine, based on the type of gesture and the image input, whether the gesture references the first object of the plurality of objects.

16. The non-transitory computer-readable storage medium of claim 15, wherein determining, based on the type of gesture and the image input, whether the gesture references the first object of the plurality of objects is based on when the gesture is detected during the spoken input.

17. The non-transitory computer-readable storage medium of claim 7, wherein detecting the gaze of the user is based on a portion of a display of the electronic device that the user is looking at.

18. The non-transitory computer-readable storage medium of claim 7, wherein detecting the gaze of the user is based on where the camera of the electronic device is pointed.

19. The non-transitory computer-readable storage medium of claim 17, the one or more programs further comprising instructions, which when executed by one or more processors of the electronic device, cause the electronic device to:
determine, based on the gaze of the user, whether the gaze references the first object of the plurality of objects.

20. The non-transitory computer-readable storage medium of claim 19, wherein determining, based on the gaze of the user, whether the gaze references the first object of the plurality of objects is based on when the gaze is detected during the spoken input.

21. The non-transitory computer-readable storage medium of claim 1, the one or more programs further comprising instructions, which when executed by one or more processors of the electronic device, cause the electronic device to:
in accordance a determination that the request does not reference the first object of the plurality of objects:
determine, with the selected reference resolution module, whether the request references a second object of the plurality of objects based on at least the spoken input; and
in accordance with a determination that the request references the second object of the plurality of objects, determine the response to the request including information about the second object.

22. The non-transitory computer-readable storage medium of claim 1, wherein the response to the request includes a picture of the object.

23. The non-transitory computer-readable storage medium of claim 1, wherein the response references the request.

24. The non-transitory computer-readable storage medium of claim 1, the one or more programs further comprising instructions, which when executed by one or more processors of the electronic device, cause the electronic device to:
store the relationship between the reference and the object in a historical interaction data.

25. The non-transitory computer-readable storage medium of claim 1, wherein a first reference resolution module of the plurality of reference resolution modules determines an object of the plurality of objects based a first set of factors and a second set of factors and a second reference resolution module of the plurality of reference resolution modules determines the object of the plurality of objects based on a first set of factors and a third set of factors, wherein the second set of factors is different from the first set of factors and the third set of factors.

26. An electronic device comprising:
one or more processors;
a memory; and
one or more programs, wherein the one or more programs are stored in the memory and configured to be executed by the one or more processors, the one or more programs including instructions for:
receiving a spoken input including a request;
receiving an image input including a plurality of objects;
selecting a reference resolution module of a plurality of reference resolution modules based on whether the reference resolution module of the plurality of reference resolution modules is capable of determining an object of the plurality of objects based on a first set of factors and a second set of factors included in the request and the image input;
determining, with the selected reference resolution module, whether the request references a first object of the plurality of objects based on at least the spoken input; and
in accordance with a determination that the request references the first object of the plurality of objects, determining a response to the request including information about the first object.

27. The electronic device of claim 26, wherein selecting the reference resolution module of the plurality of reference resolution modules based on whether the reference resolution module of the plurality of reference resolution modules is capable of determining an object of the plurality of objects based on a first set of factors and a second set of factors included in the request and the image input further comprises:
determining whether the object determination can be completed based on the spoken input and a historical interaction data; and
in accordance with a determination that the object determination can be completed based on the spoken input and the historical interaction data, selecting a first reference resolution module of the plurality of reference resolution modules.

28. The electronic device of claim 27, wherein the selected reference resolution module is the first reference resolution module, and wherein the determination of whether the request references the first object is based on the spoken input and the historical interaction data.

29. The electronic device of claim 26, the one or more programs the one or more programs further including instructions for:
detecting a gesture associated with the spoken input.

30. The electronic device of claim 26, the one or more programs further including instructions for:
detecting a user gaze associated with the spoken input.

31. The electronic device of claim 29, the one or more programs further including instructions for:
determining basic image features of the image input; and
determining complex image features of the image input.

32. The electronic device of claim 31, wherein the basic image features include the gesture of the user and the gaze of the user.

33. The electronic device of claim 31, wherein the complex image features include a relationship between the plurality of objects of the image input.

34. The electronic device of claim 33, wherein selecting the reference resolution module of the plurality of reference resolution modules based on whether the reference resolution module of the plurality of reference resolution modules is capable of determining an object of the plurality of objects based on a first set of factors and a second set of factors included in the request and the image input further comprises:
in accordance with a determination that the object determination cannot be completed based on the first set of factors and the second set of factors:
determining whether the object determination can be completed based on the spoken input and the basic image features, wherein the basic image features are included in a third set of factors; and
in accordance with a determination that the object determination can be completed based on the spoken input and the basic image features, selecting a second reference resolution module of the plurality of reference resolution modules.

35. The electronic device of claim 34, wherein selecting the reference resolution module of the plurality of reference resolution modules based on whether the reference resolution module of the plurality of reference resolution modules is capable of determining an object of the plurality of objects based on a first set of factors and a second set of factors included in the request and the image input further comprises:
in accordance with the determination that the object determination cannot be completed based on the first set of factors and the third set of factors:
determining whether the object determination can be completed based on the spoken input and the complex image features, wherein the complex image features are included in a fourth set of factors; and
in accordance with a determination that the object determination can be completed based on the spoken input and the complex image features, selecting a third reference resolution module of the plurality of reference resolution modules.

36. The electronic device of claim 35, wherein the selected reference resolution module is the second reference resolution module, and wherein the determination of whether the request references the first object of the plurality of objects is based on the spoken input and the basic image features.

37. The electronic device of claim 35, wherein the selected reference resolution module is the third reference resolution module, and wherein the determination of whether the request references the first object of the plurality of objects is based on the spoken input and the complex image features.

38. The electronic device of claim 29, the one or more programs further including instructions for:
determining a type of the gesture; and
determining, based on the type of gesture and the image input, whether the gesture references the first object of the plurality of objects.

39. The electronic device of claim 38, wherein determining, based on the type of gesture and the image input, whether the gesture references the first object of the plurality of objects is based on when the gesture is detected during the spoken input.

40. The electronic device of claim 30, wherein detecting the gaze of the user is based on a portion of a display of the electronic device that the user is looking at.

41. The electronic device of claim 30, wherein detecting the gaze of the user is based on where the camera of the electronic device is pointed.

42. The electronic device of claim 26, the one or more programs further including instructions for
in accordance a determination that the request does not reference the first object of the plurality of objects:
determining, with the selected reference resolution module, whether the request references a second object of the plurality of objects based on at least the spoken input; and
in accordance with a determination that the request references the second object of the plurality of objects, determining the response to the request including information about the second object.

43. The electronic device of claim 26, the one or more programs further including instructions for:

storing the relationship between the reference and the object in a historical interaction data.

44. The electronic device of claim 26, wherein a first reference resolution module of the plurality of reference resolution modules determines an object of the plurality of objects based a first set of factors and a second set of factors and a second reference resolution module of the plurality of reference resolution modules determines the object of the plurality of objects based on a first set of factors and a third set of factors, wherein the second set of factors is different from the first set of factors and the third set of factors.

45. A method, comprising:
at an electronic device with one or more processors and memory:
receiving a spoken input including a request;
receiving an image input including a plurality of objects;
selecting a reference resolution module of a plurality of reference resolution modules based on whether the reference resolution module of the plurality of reference resolution modules is capable of determining an object of the plurality of objects based on a first set of factors and a second set of factors included in the request and the image input;
determining, with the selected reference resolution module, whether the request references a first object of the plurality of objects based on at least the spoken input; and
in accordance with a determination that the request references the first object of the plurality of objects, determining a response to the request including information about the first object.

46. The method of claim 45, wherein selecting the reference resolution module of the plurality of reference resolution modules based on whether the reference resolution module of the plurality of reference resolution modules is capable of determining an object of the plurality of objects based on a first set of factors and a second set of factors included in the request and the image input further comprises:
determining whether the object determination can be completed based on the spoken input and a historical interaction data; and
in accordance with a determination that the object determination can be completed based on the spoken input and the historical interaction data, selecting a first reference resolution module of the plurality of reference resolution modules.

47. The method of claim 46, wherein the selected reference resolution module is the first reference resolution module, and wherein the determination of whether the request references the first object is based on the spoken input and the historical interaction data.

48. The method of claim 45, further comprising:
detecting a gesture associated with the spoken input.

49. The method of claim 45, further comprising:
detecting a user gaze associated with the spoken input.

50. The method of claim 48, further comprising:
determining basic image features of the image input; and
determining complex image features of the image input.

51. The method of claim 50, wherein the basic image features include the gesture of the user and the gaze of the user.

52. The method of claim 50, wherein the complex image features include a relationship between the plurality of objects of the image input.

53. The method of claim 52, wherein selecting the reference resolution module of the plurality of reference resolution modules based on whether the reference resolution module of the plurality of reference resolution modules is capable of determining an object of the plurality of objects based on a first set of factors and a second set of factors included in the request and the image input further comprises:

in accordance with a determination that the object determination cannot be completed based on the first set of factors and the second set of factors:
determining whether the object determination can be completed based on the spoken input and the basic image features, wherein the basic image features are included in a third set of factors; and
in accordance with a determination that the object determination can be completed based on the spoken input and the basic image features, selecting a second reference resolution module of the plurality of reference resolution modules.

54. The method of claim 53, wherein selecting the reference resolution module of the plurality of reference resolution modules based on whether the reference resolution module of the plurality of reference resolution modules is capable of determining an object of the plurality of objects based on a first set of factors and a second set of factors included in the request and the image input further comprises:

in accordance with the determination that the object determination cannot be completed based on the first set of factors and the third set of factors:
determining whether the object determination can be completed based on the spoken input and the complex image features, wherein the complex image features are included in a fourth set of factors; and
in accordance with a determination that the object determination can be completed based on the spoken input and the complex image features, selecting a third reference resolution module of the plurality of reference resolution modules.

55. The method of claim 54, wherein the selected reference resolution module is the second reference resolution module, and wherein the determination of whether the request references the first object of the plurality of objects is based on the spoken input and the basic image features.

56. The method of claim 54, wherein the selected reference resolution module is the third reference resolution module, and wherein the determination of whether the request references the first object of the plurality of objects is based on the spoken input and the complex image features.

57. The method of claim 48, further comprising:
determining a type of the gesture; and
determining, based on the type of gesture and the image input, whether the gesture references the first object of the plurality of objects.

58. The method of claim 57, wherein determining, based on the type of gesture and the image input, whether the gesture references the first object of the plurality of objects is based on when the gesture is detected during the spoken input.

59. The method of claim 49, wherein detecting the gaze of the user is based on a portion of a display of the electronic device that the user is looking at.

60. The method of claim 49, wherein detecting the gaze of the user is based on where the camera of the electronic device is pointed.

61. The method of claim 45, further comprising:
in accordance a determination that the request does not reference the first object of the plurality of objects:
determining, with the selected reference resolution module, whether the request references a second object of the plurality of objects based on at least the spoken input; and
in accordance with a determination that the request references the second object of the plurality of objects, determining the response to the request including information about the second object.

62. The method of claim 45:
storing the relationship between the reference and the object in a historical interaction data.

63. The method of claim 45, wherein a first reference resolution module of the plurality of reference resolution modules determines an object of the plurality of objects based a first set of factors and a second set of factors and a second reference resolution module of the plurality of reference resolution modules determines the object of the plurality of objects based on a first set of factors and a third set of factors, wherein the second set of factors is different from the first set of factors and the third set of factors.

* * * * *

UNITED STATES PATENT AND TRADEMARK OFFICE
CERTIFICATE OF CORRECTION

PATENT NO. : 12,027,166 B2
APPLICATION NO. : 17/402328
DATED : July 2, 2024
INVENTOR(S) : Hong Yu et al.

It is certified that error appears in the above-identified patent and that said Letters Patent is hereby corrected as shown below:

In the Claims

Column 25, Line 48, Claim 25, delete "based a first" and insert --based on a first--.

Column 26, Line 35, Claim 29, before "further", delete "the one or more programs".

Column 28, Line 6, Claim 44, delete "based a first" and insert --based on a first--.

Column 30, Line 39, Claim 63, delete "based a first" and insert --based on a first--.

Signed and Sealed this
Nineteenth Day of November, 2024

Katherine Kelly Vidal
*Director of the United States Patent and Trademark Office*